Aug. 18, 1970  O. WEISSING  3,524,686
HYDROSTATIC SPINDLE
Filed July 9, 1968  6 Sheets-Sheet 1
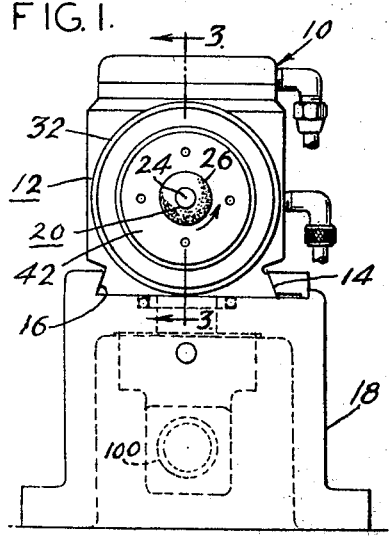
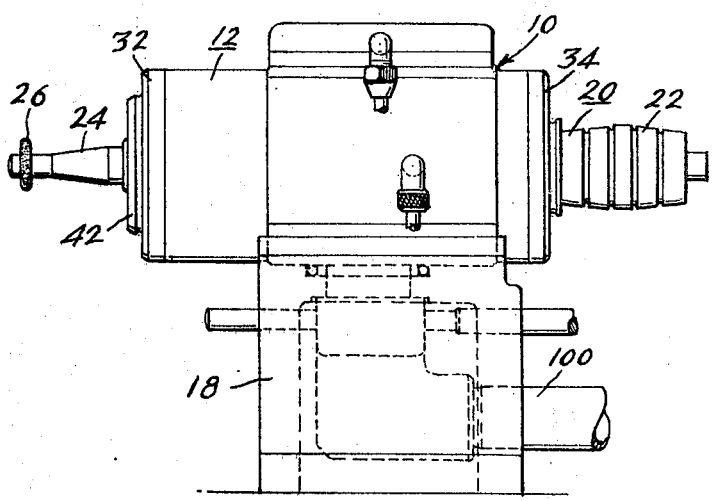
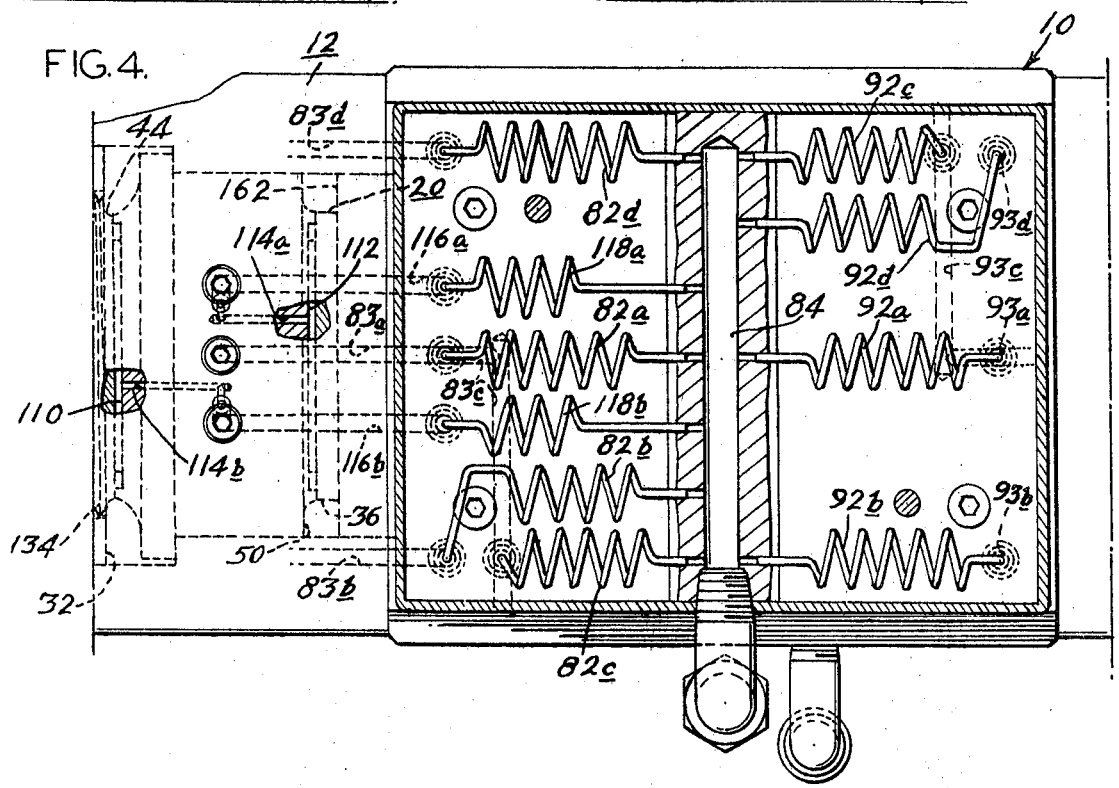
INVENTOR
OTTO WEISSING
BY
Howson & Howson
ATTYS

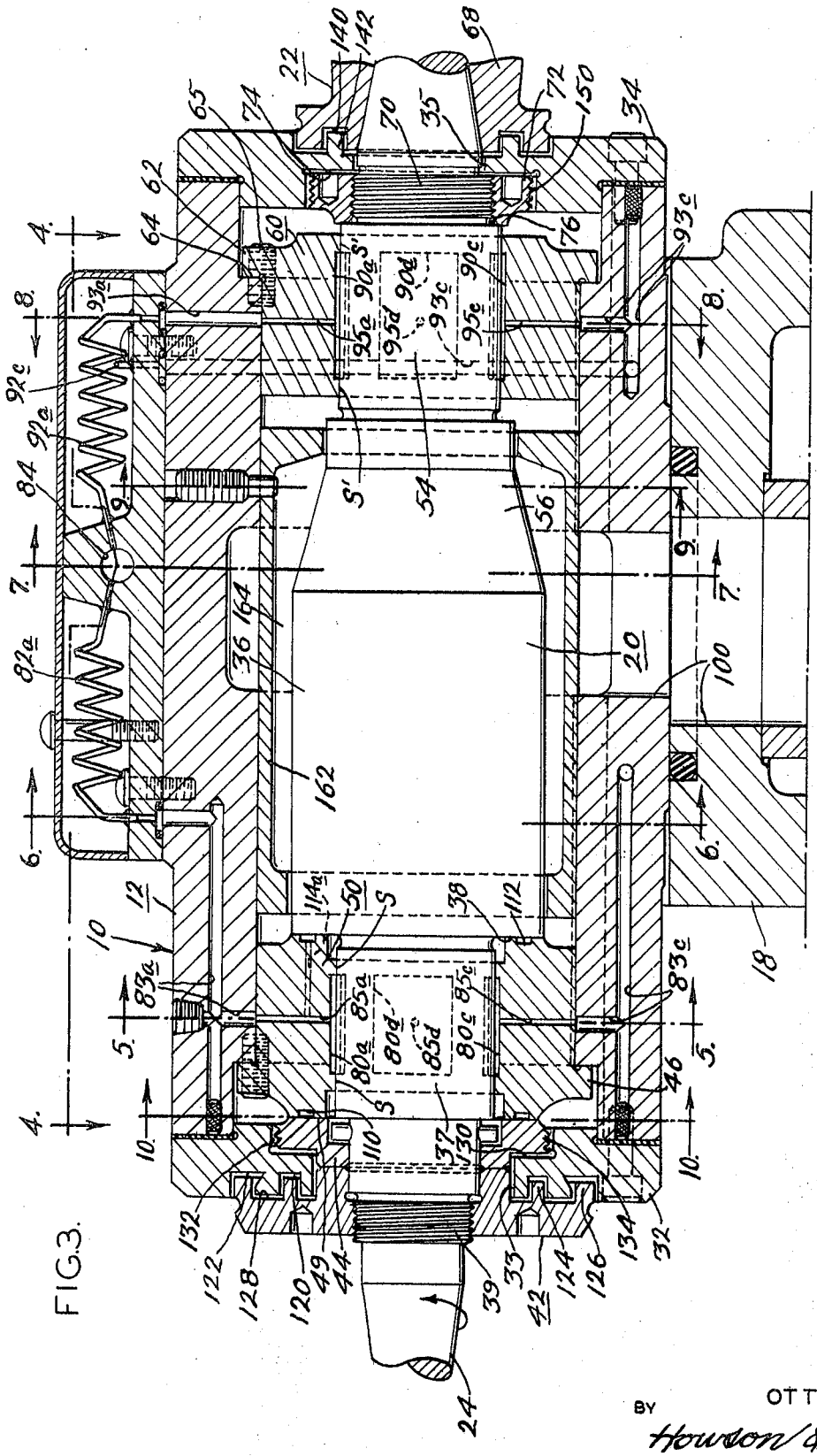

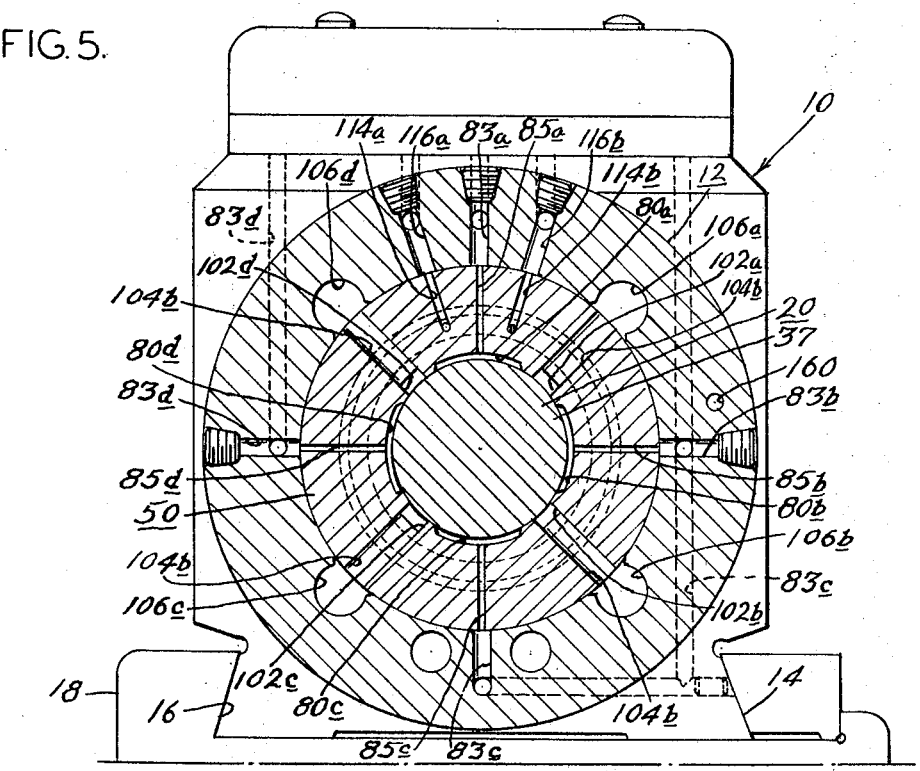
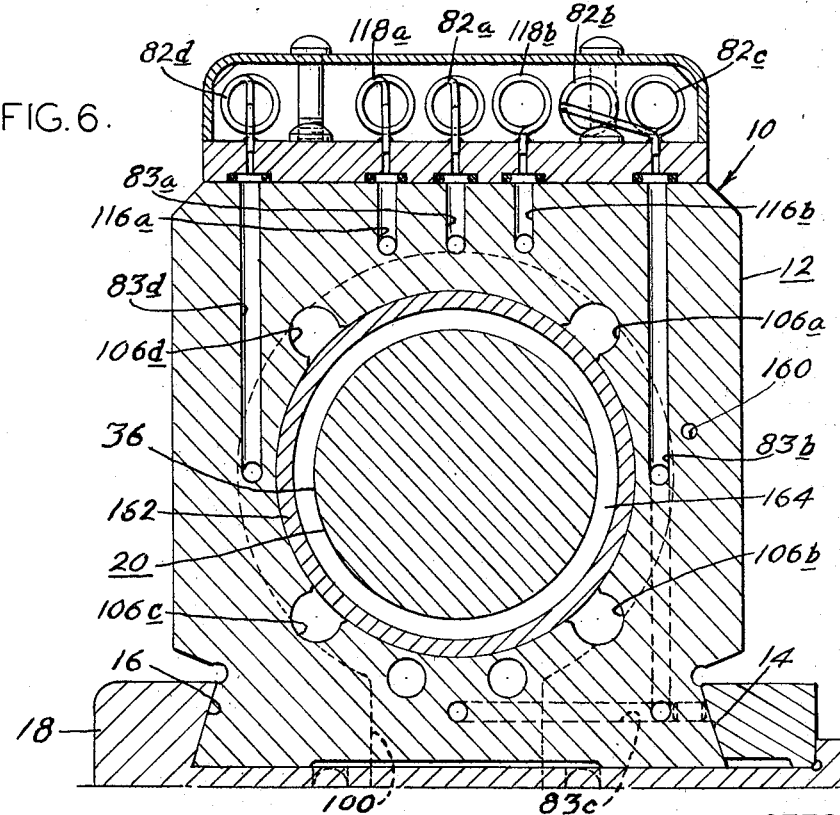

Aug. 18, 1970     O. WEISSING     3,524,686

HYDROSTATIC SPINDLE

Filed July 9, 1968     6 Sheets-Sheet 5

INVENTOR:
OTTO WEISSING
BY
Howson & Howson
ATTYS.

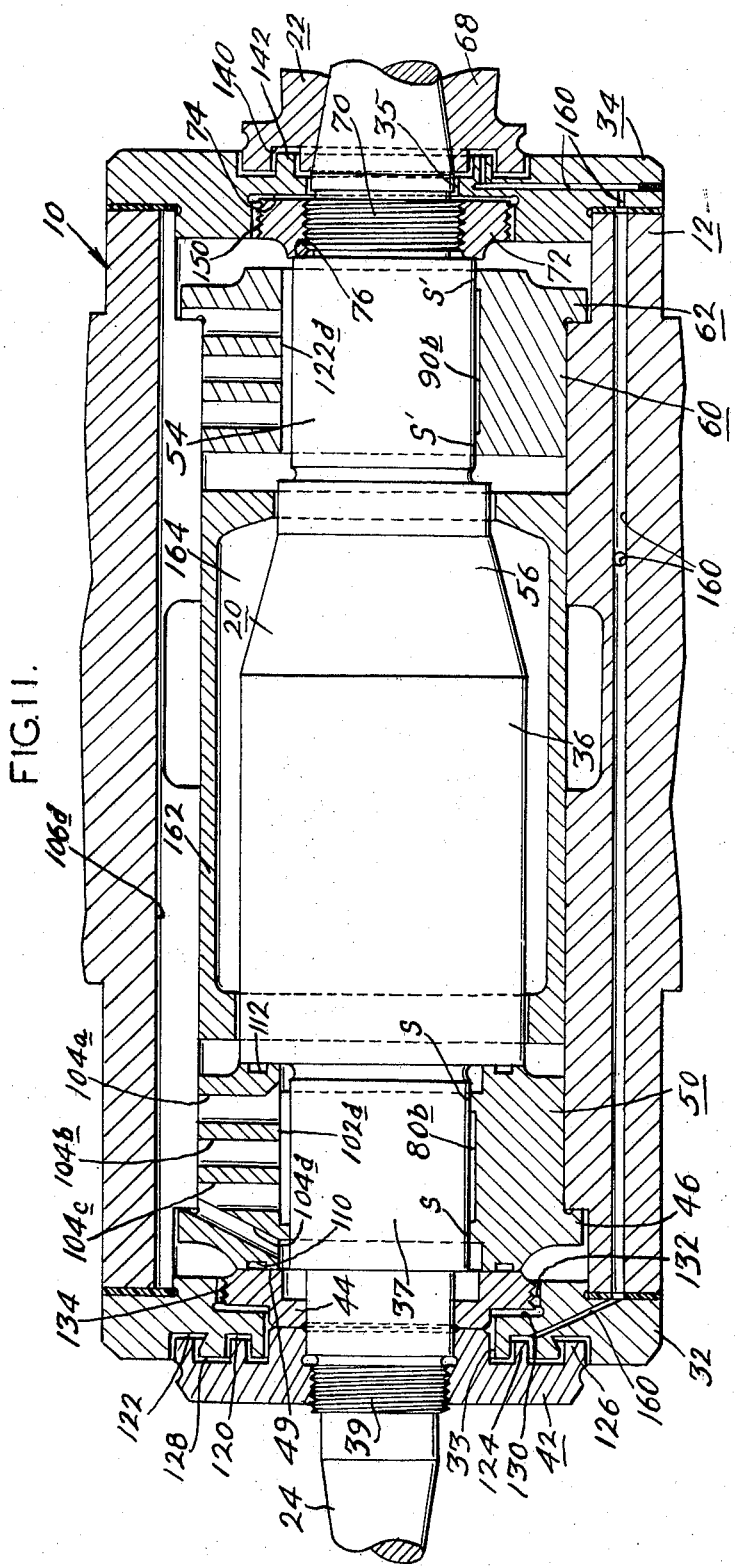

United States Patent Office 3,524,686
Patented Aug. 18, 1970

3,524,686
HYDROSTATIC SPINDLE
Otto Weissing, Towson, Md., assignor to SKF Industries, Inc., King of Prussia, Pa., a corporation of Delaware
Filed July 9, 1968, Ser. No. 743,351
Int. Cl. A16c 17/16
U.S. Cl. 308—9                                      7 Claims

ABSTRACT OF THE DISCLOSURE

In a hydrostatic spindle, an elongated generally enclosed housing, a spindle assembly rotatably mounted in the housing, said spindle assembly including a center section and generally cylindrical bearing portions or opposite sides of the center section, a pair of bearing bushings mounted in the housing within which the bearing sections are rotatably journalled, means defining a plurality of circumferentially spaced pockets in each bushing confronting the cylindrical bearing section of the spindle assembly and means for introducing a fluid under pressure into said pockets to rotatably support said spindle assembly.

---

Figure 7:
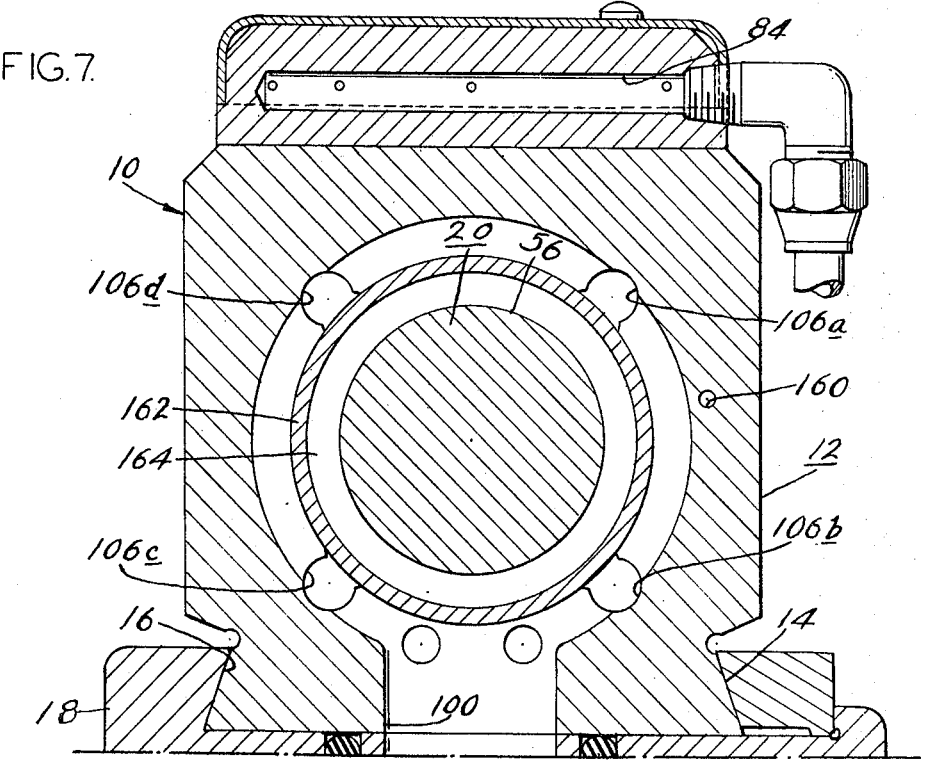
Figure 8:
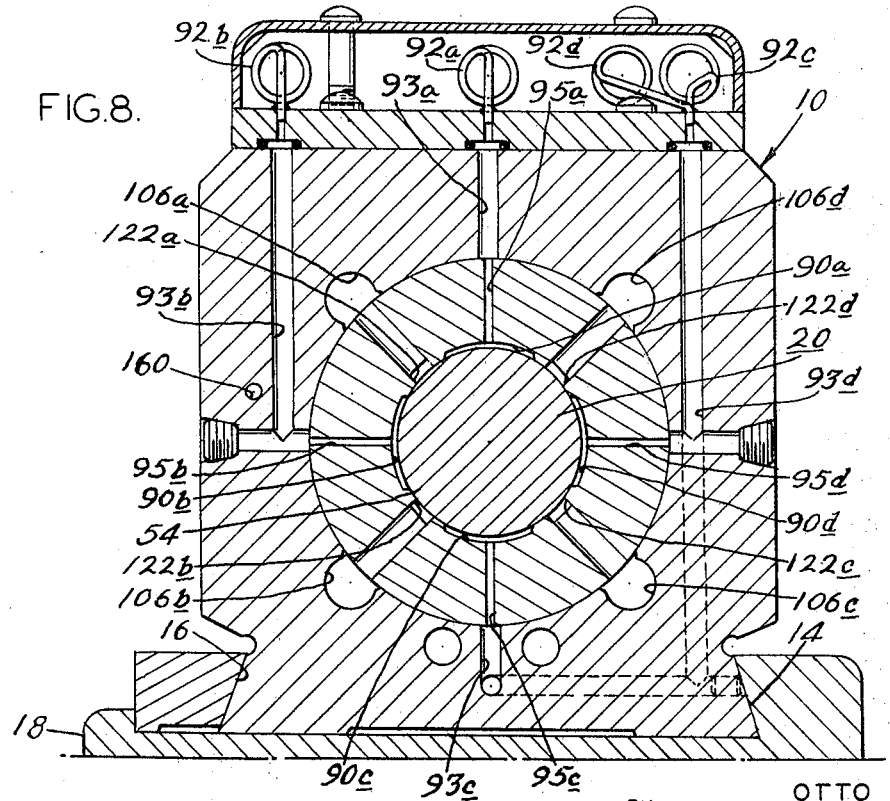
Figure 9:
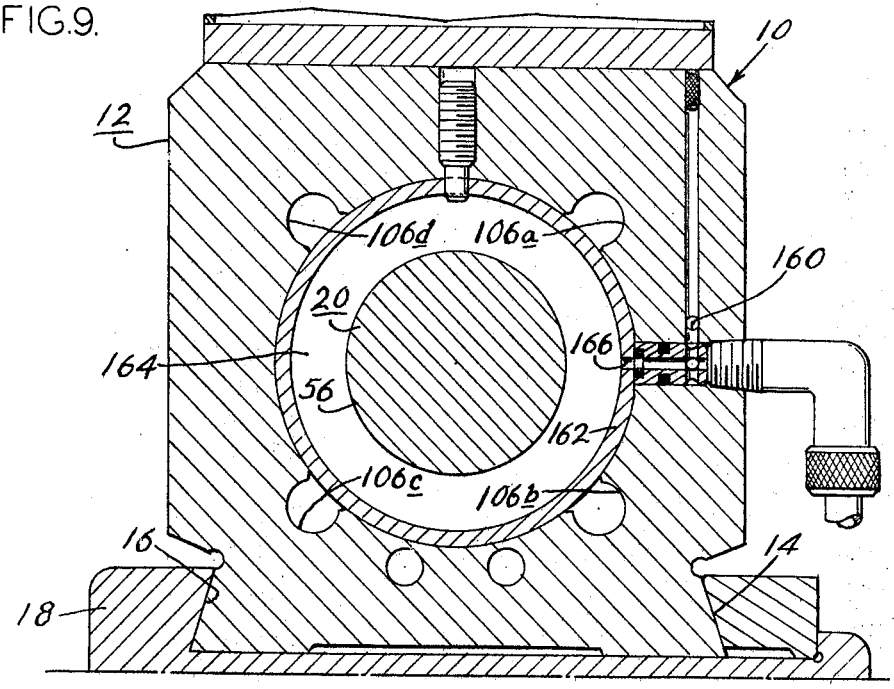

The present invention relates to improvements in spindles for machinery such as grinding apparatus and more particularly to a new and improved hydrostatic spindle.

Conventionally the spindles used in machinery such as grinding apparatus to support the grinding tool are mounted in ball or roller bearings and, as is customary, contact seals are provided to retain lubricant in the bearing support areas.

These conventional spindles which are mounted in conventional bearings which in turn employ the usual type contact seals have several disadvantages and drawbacks. For example, at extremely high spindle speeds, the bearing life and contact seal life are extremely limited and require replacement from time to time, which is expensive and time consuming and results in down time on the machine to replace these parts. Furthermore, a common characteristic of this type of prior spindle is that when it is preloaded there are vibrations set up and during operation, for example grinding, there is a certain amount of deflection which of course affects the ability to control a finished dimension on parts being ground to precise tolerances. In other words, because of vibrations and deflections, it is difficult to consistently hold close tolerances on parts being ground on the machine. Another factor necessitating replacement of the bearings is that in some instances due, for example, to carelessness of the operator, shock loads are imposed on the spindlle assembly and the bearings due to abrupt sharp contact of the spindle with the workpiece or other parts of the machine.

With the foregoing in mind, an object of the present invention is to provide a hydrostatic spindle assembly which overcomes the disadvantages and drawbacks of the prior types outlined above and more specifically to a spindle of the hydrostatic type wherein the conventional ball or roller bearings and the contact seals are eliminated. To this end, the hydrostatic spindle in its broadest aspect comprises a spindle housing, an elongated shaft mounted in the housing which has an arbor at one end which mounts a tool such as a grinding wheel and at its opposite end is adapted to be connected to a suitable drive source through a pulley to rotate the spindle. The spindle is supported adjacent opposite ends in bearing bushings which have a plurality of pockets confronting the bearing portion of the spindle. These pockets are connected through a porting and conduit arrangement to a suitable source of high pressure fluid supply including a capillary restrictor. By this arrangement during operation of the spindle the high pressure fluid enters the recesses to support the spindle at the bearing locations on a hydrostatic fluid fiim. The assembly further includes an air pressurized labyrinth seal adjacent opposite axial ends of the bearing portions of the spindle to prevent the ingress of fluid substances from exteriorly of the housing and also to prevent egress of the high pressure fluid supporting the bearings. Internally of the housing in the central portion of the shaft, there is an air pressurized chamber to prevent oil accumulation in this area which would act as a brake retarding rotation of the spindle thereby permitting it to be operated at extremely high speeds.

Figure 10:
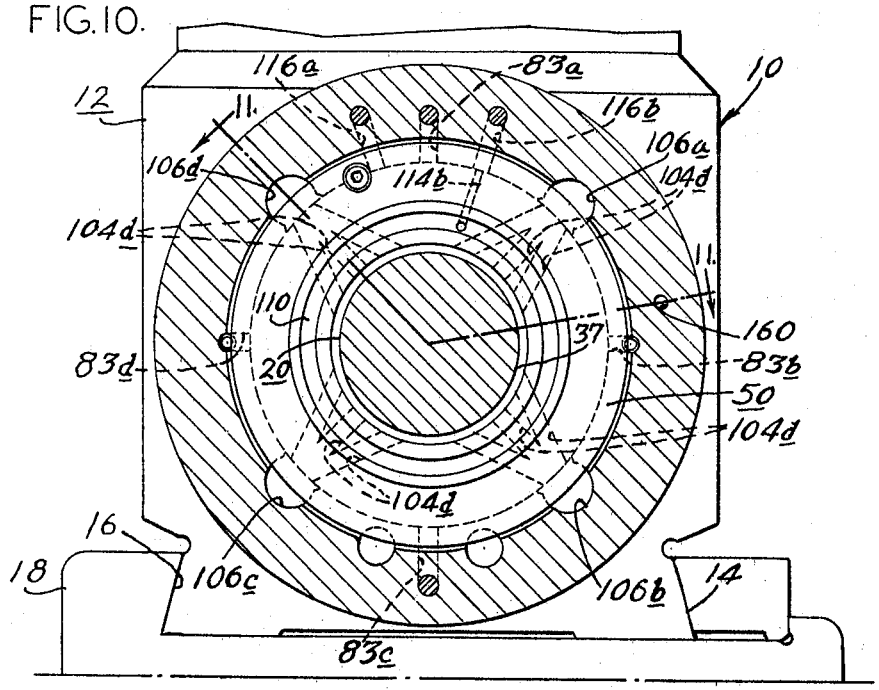

These and other objects of the present invention and various features and details of the operation and construction of a hydrostatic spindle in accordance with the present invention hereinafter more fully set forth with reference to the accompanying drawings wherein:

FIG. 1 is an end view of the spindle assembly;
FIG. 2 is a side elevational view thereof;
FIG. 3 is an enlarged transverse sectional view taken on line 3—3 of FIG. 1;
FIGS. 4–10, inclusive, are enlarged sectional views taken on lines 4—4, 5—5, 6—6, 7—7, 8—8, 9—9 and 10—10 of FIG. 3;
FIG. 11 is another transverse longitudinal sectional view taken on lines 11—11 of FIG. 10 showing the details of the high pressure drainage system.

Referring now to the drawing and particularly to FIGS. 1 and 2 thereof, there is illustrated a grinding head assembly designated by numeral 10 incorporating a hydrostatic spindle assembly in accordance with the present invention. Even though the present invention is illustrated and described in connection with a grinding machine used for internal grinding, it is to be understood that the invention has many other useful applications.

The spindle assembly as illustrated in the drawings comprises an elongated housing 12 having a dovetail projection 14 engaging in a dovetail slot 16 of a support 18 which in turn is mounted on the main frame of the machine such as a grinder and a spindle assembly 20 rotatably mounted in the housing including a pulley 22 at one end projecting externally from one end of the housing and an arbor 24 at its opposite end which in the present instance mounts at its free end a grinding tool 26.

Considering now the specific structural arrangement of the hydrostatic spindle in accordance with the present invention and particularly with reference to FIG. 3, the assembly includes a generally cylindrical housing which is open at opposite axial ends and has a pair of end covers 32 and 34 which are secured adjacent opposite axial ends of the housing by screw members, the covers 32 and 34 having central openings 33 and 35 respectively through which the opposite terminal ends of the spindle project. The spindle or shaft as illustrated as an enlarged central section 36 and a front cylindrical bearing section 37 of reduced cross section projecting from the front end of the central section defining an annular thrust shoulder 38 at the juncture of the central section 36 and front cylindrical section 37. As illustrated, the arbor 24 projects from the outer face of the cylindrical section 37 and has a reduced throat section 39 on which is threaded a retaining nut 42 which in turn presses an annular washer 44 against the outer axial end face 49 of a bearing bushing 50 circumscribing the front cylindrical section 37 of the spindle. The housing has a step adjacent the front axial end thereof against which a flange portion 46 of the bearing bushing seats.

The opposite end of the shaft also has a cylindrical rear bearing section 54 projecting from a frusto-conical end portion 56 of the central section 36 of the shaft. This cylindrical section 54 is also circumscribed by a rear bearing bushing 60 having a circumferentially extending radial flange 62 which abuts against a stepped shoulder 64 in the rear end of the housing, the bearing bushing 60 being fixed in this position by means of screw member 65. The rear terminal end of the shaft mounts a pulley sleeve 68 and is threaded as at 70 adjacent the bearing section 54 to receive a lock nut 72 which nests in a pocket 74 in the inside face rear end cover 34 and abuts the end shoulder 76 of the rear bearing section as best illustrated in FIG. 3.

In accordance with the present invention, means is provided for hydrostatically supporting the spindle during rotation in the housing in a manner which eliminates the need for conventional ball or roller bearings including contact seals conventionally used in equipment of this type. To this end, as best illustrated in FIG. 5, the front bearing bushing 50 is provided with, in the present instance, four circumferentially spaced recessed pockets 80a, 80b, 80c and 80d confronting the periphery of the front bearing section 49 of the spindle and the rear bearing bushing is provided with a plurality of circumferentially spaced recessed pockets 90a, 90b, 90c and 90d confronting the periphery of the rear bearing section 54 of the spindle. A pressurized fluid feed system is provided for continuously supplying a fluid such as oil under pressure to the pockets to support the spindle for rotation on a pressurized fluid film. More specifically, the feed system as best illustrated in FIG. 4 includes a manifold 84 extending transversely of the housing connected to a suitable source of high pressure fluid, for example in the vicinity of 600–800 p.s.i. and a plurality of feed lines communicating with the manifold and connected to the pockets in the bearing bushings through an arrangement of ports and passages to continuously supply high pressure fluid thereto.

More specifically, the fluid feed system includes four coiled tubes 82a, 82b, 82c and 82d connected at one end to one side of the manifold 84 and through drilled ports 83a, 83b, 83c and 83d in the housing and four radial circumferentially equispaced passages 85a, 85b, 85c and 85d with the pockets in the front bearing bushing (see FIGS. 4 and 5). The feed to the rear bearing bushing is substantially the same and includes four coiled tubes 92a, 92b, 92c and 92d connected to the opposite side of the manifold 84 and in fluid communication with the pockets 90a, 90b, 90c and 90d through ports 93a, 93b, 93c and 93d in the housing and radial passages 95a, 95b, 95c and 95d in the rear bearing bushing (see FIGS. 4 and 8). Accordingly, by this arrangement, the coiled tubing may be of a sufficient cross section to insure reliable flow therethrough and preclude the danger of blockage of one of the passageways, the coiled arrangement providing a long flow line in effect providing the same advantage of a straight tube of capillary cross section and eliminating the problem of blockage, the overall arrangement being referred to herein as a "capillary restrictor" feed system.

In operation, therefore, the fluid delivered to the pockets builds up a pressure therein to support the spindle and permit operation at extremely high speeds. During operation fluid leakage past the side sills S and S' of the pockets in the front and rear bearing bushings is vented through a vent system to a main drain 100 for recirculation through the feed system. More specifically, the vented through a vent system to a main drain 100 for re- 102b, 102c and 102d in the front bearing between the pockets, extending beyond the sills S (see FIG. 11), each slot having three radial legs 104a, 104b, 104c and an angled leg 104d which communicate with axial passages 106a, 106b, 106c and 106d in the housing emptying into the drain 100. The rear bearing bushing venting includes a similar arrangement of slots 122a, 122b, 122c and 122d and legs connecting into the passages 106a, 106b, 106c and 106d.

In the present instance the front bearing bushing in addition to supporting a radial load on the spindle also withstands axial loads and, to this end, the front bearing bushing 50 is provided with a pair of annular circumferentially extending grooves 110 and 112 in opposite axial end faces thereof, the groove 110 confronting and defining a chamber between the bushing and the adjusting nut 44 and the groove 112 confronting the shoulder at the juncture of the central and front cylindrical portions of the spindle. High pressure fluid is supplied to these chambers through a system of radial ports 114a and 114b in the front bearing bushing 50, passageways 116a and 116b in the housing and coiled tubes 118a and 118b to the main supply manifold 84.

Another feature of the present invention is the provision of a labyrinth type seal at opposite ends of the housing which serves to prevent leakage of pressure fluid from interiorly of the housing and also serves to prevent entrance of dirt and foreign matter into the interior of the housing. To this end, as best illustrated in FIGS. 3 and 11, the end cover 32 is provided with a pair of circumferentially extending radially spaced grooves 120 and 122 in its outer end face and the retaining nut 42 has a pair of radially spaced circumferentially extending ribs 124 and 126 which nest in the grooves in the end cover and are spaced therefrom to define a serpentine path 128 therebetween. The end cover 32 has an undercut 130 on its inner face within which the spacer 44 seats in spaced relation thereto to define the inner leg 132 of the serpentine path 128 communicating with the interior of the housing. The outer peripheral surface of the spacer 44 is threaded as at 134, the thread oriented in a predetermined direction relative to the direction of rotation of the spindle to retard flow of fluid outwardly to serve as a further means for retaining the lubricant against escape through the labyrinthian passage. In the present instance with the spindle rotating in the direction indicated in FIG. 3, the thread 134 is a right hand thread. A labyrinth passage is provided at the opposite rear end of the housing defined by a circumferential groove 140 in the inner face of the pulley sleeve 68 and a rib 142 on the end cover 34 which nests in the groove. The inner leg of the passage is provided by the locking nut 72 and the recess in the inner wall of end cover 34. The outer peripheral surface of locking nut 72 is threaded as at 150 in a direction relative to rotation of the spindle to retain lubricant in the housing. In the present instance the thread is a left-hand thread.

The labyrinth passages are pressurized and, to this end, internal porting broadly designated 160 is provided in the housing which is connected to an exterior source of high air pressure air supply.

Another feature of the present invention is provision of means for restricting the high pressure fluid to predetermined areas of the housing and specifically in the provision of means preventing flow to the central section of the spindle which would act as a brake and limit the capacity of the spindle to operate at high speeds. To this end there is provided a collar 162 fitted in the housing which closely circumscribes the central section of the spindle at opposite terminal ends and is spaced therefrom to define an interior pressure chamber 164 which through a suitable passage 166 in the housing connects the chamber 164 to the air supply. Thus, in operation the air pressure in the chamber cools the spindle and also prevents accumulation of oil in the chamber which would retard rotation of the spindle or act as a brake.

Considering now the operation of the hydrostatic spindle in accordance with the present invention and particularly in connection with the operation of the spindle as applied to an internal grinder, the fluid and air pressure sources may be operatively associated by suitable electrical circuitry with the motor circuit for rotating the spindle so that the spindle assembly is air and fluid pressurized at start up. More specifically, fluid pressure builds up in the pockets fronting the bearing sections 37 and 54 of the spindle to provide a hydrostatic support for the spindle during rotation thereof. In the present instance, there is also pressure built up in the recesses 110 and 112 to support the spindle assembly for axial load. During operation there is fluid leakage through the sills S and S' which flows to the radial legs in the front and rear bearing bushings, through the axial passages and thence to the main drain as best illustrated in FIGS. 3 and 7. Air pressure in the air pressurized chamber 164 surrounding the center section 36 of the spindle assembly prevents egress of drainage fluid into this chamber which might act as a drag or braking force retarding rotation of the spindle thereby permitting operating thereof at high speeds. Also the labyrinth air pressure seal at opposite ends of the housing insures against leakage of fluid at these locations and also insures against ingress of dirt and foreign matter. Further, the threaded configuration of the lock nuts at opposite ends of the housing also acts to retard flow of fluid out of the housing.

In view of the above it is readily apparent that the hydrostatic spindle of the present invention has many advantages over the conventional ball or roller type bearing which employ contact seals. These seals, in addition to the fact that they wear and therefore require replacement, are not completely effective particularly at high speeds to insure against leakage of lubricant from the bearings. Consequently, the bearing has to be checked or inspected periodically to insure adequate lubrication. Furthermore, it has been found that with conventional bearings the speed of rotation of the spindle is limited whereas the hydrostatic spindle of the present invention permits operation at extremely high speeds.

Additionally, as noted previously, the hydrostatic spindle of the present invention eliminates the operational vibration problems of prior ball or roller bearing supported spindles and also the deflection which is characteristic of the prior spindles. Vibration and deflection render it difficult to control the finished dimension of parts being ground to precise tolerances. The hydrostatic spindle of the present invention also is able to withstand greater shockloads without damage to parts thereof, which was not the case with prior roller and ball supported spindles. Furthermore, it is noted that the thrust carrying arrangement including the washer 44 are located at the working end of the spindle whereby the effect of thermal expansion of the workhead is minimized. Further by the arrangement illustrated, the end of the spindle opposite the working end mounting the grinding tool 26 floats freely thereby to compensate for thermal expansion of the spindle.

While a particular embodiment of the present invention has been illustrated and described herein, it is not intended to limit the invention, and changes and modifications may be made therein within the scope of the following claims.

I claim:

1. In a hydrostatic spindle, an elongated generally enclosed housing, a spindle assembly rotatably mounted in the housing, said spindle assembly including a center section and generally cylindrical bearing portions on opposite sides of the center section, a pair of bearing bushings mounted in the housing within which the bearing sections are rotatably journalled, means defining a plurality of circumferentially spaced pockets in each bushing confronting the cylindrical bearing section of the spindle assembly, means for introducing a fluid under pressure into said pockets to rotatably support said spindle assembly, air pressurized labyrinth passages at opposite ends of said housing operable to prevent escape of fluid from interiorly of the housing and to prevent ingress of foreign matter from exteriorly of the housing, said labyrinth passage being formed in part by a nut member having a threaded exterior circumferentially extending surface forming the terminal end of the labyrinth path internally of the housing.

2. In a hydrostatic spindle, an elongated generally enclosed housing, a spindle assembly rotatably mounted in the housing, said spindle assembly including a center section and generally cylindrical bearing portions on opposite sides of the center section, a pair of bearing bushings mounted in the housing within which the bearing sections are rotatably journalled, means defining a plurality of circumferentially spaced pockets in each bushing confronting the cylindrical bearing section of the spindle assembly, means for introducing a fluid under pressure into said pockets to rotatably support said spindle assembly, said center section being spaced from the interior wall of the housing to define a chamber and means for air pressurizing the chamber to thereby prevent pressurized fluid from said pockets entering into said chamber which would act as a brake limiting rotation of the spindle.

3. A hydrostatic spindle as claimed in claim 2 wherein said means for fluid pressurizing said pockets includes a manifold in said housing, a plurality of coiled tubes communicating at one end with said manifold and at their opposite ends with a plurality of passages in turn communicating with the pockets formed in said bearing bushings.

4. A hydrostatic spindle as claimed in claim 2 including means for withstanding thrust on the spindle assembly.

5. A hydrostatic spindle as claimed in claim 4 wherein said thrust means includes a pair of annular grooves in opposite axial end faces of one of said bearing bushings and including passage means for introducing a fluid under pressure into said grooves.

6. A hydrostatic spindle as claimed in claim 5 wherein one of said grooves confronts a radial shoulder at the juncture of the center section and bearing section of the spindle and the other of said grooves confronts a washer mounted at one axial end of the housing.

7. In a hydrostatic spindle, an elongated generally enclosed housing, a spindle assembly rotatably mounted in the housing, said spindle assembly including a center section and generally cylindrical bearing portions on opposite sides of the center section, a pair of bearing bushings mounted in the housing within which the bearing sections are rotatably journalled, means defining a plurality of circumferentially spaced pockets in each bushing confronting the cylindrical bearing section of the spindle assembly, a collar member mounted on opposite ends of said spindle, means defining at least one circumferentially extending groove in opposite axial end faces of at least one of said bushings, said groove in one axial end of the bushing confronting a radial shoulder at the juncture of the center section and bearing portion of said spindle, the other of said grooves confronting one of said collar members, means for introducing a fluid under pressure into said pockets and grooves consisting of a manifold for a pressurized fluid in said housing and a plurality of coiled tubes communicating at one end of said manifold and at opposite ends with a plurality of passages in turn communicating with the pockets and grooves, means defining a labyrinth passage at opposite ends of said housing and means for introducing pressurized air into said labyrinth passages at opposite ends of said housing operable to prevent escape of fluid from interiorly of the housing and to prevent ingress of foreign matter from exteriorly of the housing.

References Cited

UNITED STATES PATENTS

| | | | |
|---|---|---|---|
| 1,957,054 | 5/1934 | Waldorf | 308—36.3 |
| 2,407,807 | 9/1946 | Bentley | 308—36.3 |
| 2,578,711 | 12/1951 | Mortellotte | 308—122 |
| 3,193,334 | 7/1965 | Porath | 308—122 |
| 3,193,337 | 7/1965 | Levesque et al. | 308—122 |

MARTIN P. SCHWADRON, Primary Examiner

FRANK SUSKO, Assistant Examiner

PO-1050
(5/69)

UNITED STATES PATENT OFFICE
CERTIFICATE OF CORRECTION

Patent No. 3,524,686          Dated August 18, 1970

Inventor(s) OTTO WEISSING

It is certified that error appears in the above-identified patent and that said Letters Patent are hereby corrected as shown below:

Column 3, lines 61-63; "More specifically, the vented through a vent system to a main drain 100 for re-102b, 102c and 102d" should read --More specifically, the venting system includes a series of four axial slots 102a, 102b, 102c and 102d--

Column 4, line 48; "of high air pressure air supply" should read --of high pressure air supply--

SIGNED AND
SEALED
NOV 17 1970

(SEAL)
Attest:

Edward M. Fletcher, Jr.
Attesting Officer

WILLIAM E. SCHUYLER, JR.
Commissioner of Patents